(12) United States Patent
Bramley et al.

(10) Patent No.: US 11,173,496 B2
(45) Date of Patent: Nov. 16, 2021

(54) FLYWHEEL AND PADDLE ASSEMBLY FOR A CHIPPING OR SHREDDING APPARATUS, AND AN APPARATUS INCORPORATING SAME

(71) Applicant: WOODLAND MILLS INC., Port Perry (CA)

(72) Inventors: Neil K. Bramley, Port Perry (CA); Joshua J. Malcolm, Port Perry (CA)

(73) Assignee: WOODLAND MILLS INC., Ontario (CA)

( * ) Notice: Subject to any disclaimer, the term of this patent is extended or adjusted under 35 U.S.C. 154(b) by 0 days.

(21) Appl. No.: 16/637,627

(22) PCT Filed: Sep. 20, 2019

(86) PCT No.: PCT/CA2019/000131
§ 371 (c)(1),
(2) Date: Feb. 7, 2020

(87) PCT Pub. No.: WO2020/069595
PCT Pub. Date: Apr. 9, 2020

(65) Prior Publication Data
US 2021/0213460 A1    Jul. 15, 2021

(30) Foreign Application Priority Data
Oct. 3, 2018   (CA) ................................ CA 3019727

(51) Int. Cl.
*B02C 18/24*   (2006.01)
*B27L 11/00*   (2006.01)
(Continued)

(52) U.S. Cl.
CPC .......... *B02C 18/24* (2013.01); *B02C 18/2216* (2013.01); *B02C 18/2283* (2013.01); *B27L 11/002* (2013.01); *B27L 11/02* (2013.01)

(58) Field of Classification Search
CPC ....... B02C 18/24; B02C 18/38; B27L 11/002; B27L 11/02
See application file for complete search history.

(56) References Cited

U.S. PATENT DOCUMENTS

| 184,912 A | 11/1876 | Sangster | ........................ 144/176 |
| 633,646 A | 9/1899 | Hagerty | ........................... 241/92 |

(Continued)

FOREIGN PATENT DOCUMENTS

| FR | 2498975 A1 | 8/1982 | .............. B27L 11/02 |
| GB | 2288346 A * | 10/1995 | ............ B02C 18/143 |

OTHER PUBLICATIONS

Notification of Transmittal of the International Search Report and the Written Opinion of the International Searching Authority, or the Declaration dated Nov. 14, 2019, which was issued by the International Bureau of WIPO in Applicant's corresponding international PCT application having Serial No. PCT/CA2019/000131, filed on Sep. 20, 2019.

(Continued)

*Primary Examiner* — Edward T Tolan
*Assistant Examiner* — Jared O Brown
(74) *Attorney, Agent, or Firm* — Bodner & O'Rourke, LLP; Gerald T. Bodner; Christian P. Bodner

(57) ABSTRACT

A flywheel and paddle assembly for a chipping or shredding apparatus, including a wood chipper, a brush chipper, and a leaf shredder. The assembly has a flywheel attached coaxially to a drive shaft. The flywheel has at least one aperture extending from the front side to the back side, and carries at least one knife adjacent to the at least one aperture. The knife presents a knife edge on the front side of the flywheel. A paddle is rotatably mounted coaxially to the drive shaft adjacent to the back side of the flywheel. The paddle is configured to rotate on the drive shaft independently of the flywheel. A chipping or shredding apparatus incorporating (Continued)

the aforesaid flywheel and paddle assembly is also disclosed.

1 Claim, 6 Drawing Sheets

(51) Int. Cl.
*B27L 11/02* (2006.01)
*B02C 18/22* (2006.01)

(56) References Cited

U.S. PATENT DOCUMENTS

| | | | | |
|---|---|---|---|---|
| 3,000,411 A | | 9/1961 | Ealet ........................... 144/176 |
| 3,572,594 A | * | 3/1971 | Kershaw ................. B27L 11/02 |
| | | | | 241/55 |
| 3,635,410 A | | 1/1972 | Smith ............................ 241/56 |
| 3,861,602 A | | 1/1975 | Smith ............................ 241/92 |
| 4,159,083 A | | 6/1979 | Lapointe ........................ 241/68 |
| 4,235,382 A | * | 11/1980 | Smith ..................... B27L 11/02 |
| | | | | 241/28 |
| 4,340,377 A | * | 7/1982 | Johnson ................ F16H 7/0827 |
| | | | | 474/81 |
| 4,360,166 A | | 11/1982 | Biersack ........................ 241/92 |
| 4,736,781 A | | 4/1988 | Morey et al. ................. 144/176 |
| 4,770,217 A | | 9/1988 | Strong ........................... 144/176 |
| 4,796,819 A | | 1/1989 | Waterman ..................... 241/92 |
| 5,018,672 A | | 5/1991 | Peck et al. .................... 241/37.5 |
| 5,261,469 A | | 11/1993 | Severson ..................... 144/176 |
| 5,381,970 A | | 1/1995 | Bold et al. ..................... 241/55 |
| 5,385,308 A | | 1/1995 | Gearing et al. ........... 241/101.78 |
| 5,390,865 A | * | 2/1995 | Vandermolen .......... B02C 13/04 |
| | | | | 241/101.76 |
| 5,427,162 A | | 6/1995 | Carter ........................... 144/176 |
| 5,707,017 A | | 1/1998 | Paolucci et al. ................ 241/55 |
| 5,961,057 A | | 10/1999 | Turner .......................... 241/92 |
| 6,027,055 A | | 2/2000 | Doskocil ....................... 241/55 |
| 7,552,884 B2 | | 6/2009 | Gross et al. ................. 241/261.1 |
| 7,798,436 B2 | | 9/2010 | Cornelius ...................... 241/55 |
| 7,878,434 B2 | | 2/2011 | Grant et al. ................. 241/37.5 |
| 8,616,477 B1 | | 12/2013 | Inman ............................ 241/55 |
| 2006/0016514 A1 | | 1/2006 | Ford ........................... 144/162.1 |
| 2009/0140088 A1 | * | 6/2009 | Gross .................. B02C 18/2216 |
| | | | | 241/73 |
| 2014/0231559 A1 | * | 8/2014 | Schie ................... B27L 11/002 |
| | | | | 241/37.5 |
| 2014/0252150 A1 | | 9/2014 | Amornpimol ................. 241/92 |

OTHER PUBLICATIONS

Written Opinion of the International Searching Authority, dated Nov. 14, 2019, which was issued by the International Bureau of WIPO in Applicant's corresponding international PCT application having Serial No. PCT/CA2019/000131, filed on Sep. 20, 2019.

International Search Report, dated Nov. 14, 2019, which was issued by the International Bureau of WIPO in Applicant's corresponding international PCT application having Serial No. PCT/CA2019/000131, filed on Sep. 20, 2019.

* cited by examiner

FLYWHEEL AND PADDLE ASSEMBLY FOR A CHIPPING OR SHREDDING APPARATUS, AND AN APPARATUS INCORPORATING SAME

FIELD OF THE INVENTION

The present invention relates to the field of chipping or shredding apparatuses. More particularly, the present invention relates to disk type chippers or shredders wherein one or more cutting knives are carried rotatably on the face of a rotating disk-shaped flywheel.

BACKGROUND OF THE INVENTION

Many industrial, commercial, and household applications require the breaking up of relatively large objects into smaller pieces. The reduction process is variously referred to as cutting, chipping, shredding, mulching, or grinding, depending in part on the size of the end product.

It is known to accomplish such a reduction process with a chipping or shredding apparatus of the type having knives mounted directly onto a rotating disk, or flywheel. The flywheel is typically a relatively heavy, steel disk mounted in a housing. The flywheel has slots or apertures where the knives are mounted. The known apparatuses are typically configured to allow lawn and garden vegetable, and cellulosic material to be fed into the apparatus through one side of the housing, to make contact with the knives on the rotating flywheel. Particles of the material chipped or shredded by the knives, ranging up to about ¾ to ½ inches in size, are discharged out from the apparatus through another side of the housing. Discharge of material particles from the housing is typically facilitated with a paddle attached to the back side of the flywheel.

Known paddles include blades, or vanes configured to create an air stream to blow material particles out from the housing, and/or to physically throw the material particles out from the housing.

By way of example, material to be chipped or shredded by known chipping or shredding apparatuses may include portions of trees, brush, and shrubs, including, tree trunks, limbs, and branches, as well as smaller vegetable matter, such as leaves, twigs, sticks, weeds, and small plants.

Known chipping or shredding apparatuses are driven by combustion engines, or by drive shafts adapted to be connected to the drive train of a tractor (i.e. power take off (PTO)), or other machine.

Examples of known chipping and shredding apparatuses include: U.S. Pat. Nos. 184,912; 633,646; 3,000,411; 3,635, 410; 3,861,602; 4,159,083; 4,360,166; 4,736,781; 4,770, 217; 4,796,819; 5,018,672; 5,261,469; 5,381,970; 5,385, 308; 5,390,865; 5,707,017; 5,961,057; 6,027,055; 7,552, 884; 7,798,436; 7,878,434; 8,616,477; and U.S. Pat. App. Pub. Nos. 2014/0231559; and 2014/0252150.

A problem with prior art chipping and shredding apparatuses is that when they are configured to rotate the flywheel at a speed that is optimized for chipping or shredding material, the resulting speed of the rotation of the paddle is slower than optimal, resulting in sub optimal material particle discharge performance. On the other hand, when they are configured to rotate the paddle at a speed that is optimized for discharging material particles from the housing, the resulting rotational speed of the flywheel is faster than optimal, resulting in suboptimal chipping or shredding performance. In between the two above scenarios there are chipping and shredding apparatuses which are configured to rotate the flywheel at a rotational speed that is some amount faster than optimal for chipping or shredding, to allow the paddle to be rotated at a rotational speed that is closer to optimal for discharging material particles from the housing.

Accordingly, there is a continuing need for improvements in chipping and shredding apparatuses.

SUMMARY OF THE INVENTION

What is desired therefore, is a flywheel and paddle assembly for a chipping or shredding apparatus, which overcomes at least some of the problems associated with the prior art. Also desired is a chipping or shredding assembly incorporating such a flywheel and paddle assembly.

According to a preferred embodiment of the present invention, there is disclosed a chipping or shredding apparatus in the form of a wood chipper. The preferred wood chipper has a flywheel and paddle assembly comprising a drive shaft, a flywheel attached coaxially to the drive shaft, and a paddle rotatably mounted coaxially to the drive shaft adjacent to the back side of the flywheel. The paddle is configured to rotate independently of the flywheel. Since the paddle is configured to rotate independently of the flywheel, the paddle may be configured to rotate at a faster, or a slower rotational speed than the flywheel. However, the paddle may nevertheless be configured to rotate at substantially the same speed as the flywheel. Additionally, because the paddle is configured to rotate independently of the flywheel, the paddle may also be configured to rotate in a rotational direction that is the same as, or opposite to, a rotational direction of the flywheel.

The preferred embodiment of the present invention includes a transmission configured to operatively connect the drive shaft to the paddle, such that rotation of the drive shaft directly drives rotation of the flywheel, and indirectly drives rotation of the paddle via the transmission. Preferably, the transmission may include an arrangement of wheels, or an arrangement of wheels and belts or chains, operatively connecting the drive shaft to the paddle. The wheels may be in the form of gears, sprockets, pulleys, and the like. Most preferably, the transmission is an arrangement of pulleys, including a first pulley attached coaxially to the paddle, a second pulley attached coaxially to the drive shaft, and a third pulley interconnected between the first pulley and the second pulley. By way of example, belts may be used to operably interconnect the arrangement of pulleys of the preferred transmission. Preferably, the belt contacting regions of the pulleys constituting the arrangement of pulleys may be provided with diameters predetermined to provide a desired ratio between the rotational speed of the flywheel and the rotational speed of the paddle.

Therefore, according to one aspect of the present invention, there is disclosed a flywheel and paddle assembly for a chipping or shredding apparatus, said assembly comprising:

a drive shaft;

a flywheel attached coaxially to said drive shaft, said flywheel having a front side, a back side, and at least one aperture extending from the front side to the back side;

at least one knife carried by said flywheel adjacent to said at least one aperture, said at least one knife presenting a knife edge on the front side of said flywheel; and a paddle rotatably mounted coaxially to said drive shaft adjacent to said back side of said flywheel, said paddle being configured to rotate on said drive shaft independently of said flywheel.

According to another aspect of the present invention, there is disclosed a chipping or shredding apparatus comprising:
- a housing having an inlet opening for feeding material into said housing and an outlet opening for discharging material particles from said housing; and
- the flywheel and paddle assembly described above, positioned at least partly within said housing, and configured to chip or shred said material fed through said inlet opening into said material particles, and to discharge said material particles out through said outlet opening.

Preferably, the flywheel and paddle assembly may further comprise:
- a transmission configured to operatively connect said drive shaft to said paddle;
- wherein rotation of said drive shaft directly drives rotation of said flywheel, and indirectly drives rotation of said paddle via said transmission.

Optionally, the transmission may comprise an arrangement of wheels, or an arrangement of wheels and belts or chains, operatively connecting said drive shaft to said paddle.

According to yet another aspect of the present invention, there is disclosed a method of making a chipping or shredding apparatus, said method comprising the steps of:
- providing a drive shaft;
- coaxially attaching a flywheel to said drive shaft, said flywheel having a front side, a back side, and at least one aperture extending from the front side to the back side;
- mounting at least one knife to said flywheel adjacent to said at least one aperture, said at least one knife presenting a knife edge on the front side of said flywheel; and
- rotatably mounting a paddle coaxially to said drive shaft adjacent to said back side of said flywheel;
- wherein said paddle is configured to rotate on said drive shaft independently of said flywheel.

According to yet another aspect of the present invention, there is disclosed a method of adjusting a rotational speed of a paddle in a chipping or shredding apparatus having a flywheel and paddle assembly comprising:
- a drive shaft;
- a flywheel attached coaxially to said drive shaft, said flywheel having a front side, a back side, and at least one aperture extending from the front side to the back side;
- at least one knife carried by said flywheel adjacent to said at least one aperture, said at least one knife presenting a knife edge on the front side of said flywheel;
- a paddle rotatably mounted coaxially to said drive shaft adjacent to said back side of said flywheel, said paddle being configured to rotate on said drive shaft independently of said flywheel; and
- a transmission configured to operatively connect said drive shaft to said paddle, such that rotation of said drive shaft directly drives rotation of said flywheel, and indirectly drives rotation of said paddle via said transmission;
- said method comprising the step of adjusting said transmission to change said rotational speed of said paddle.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

The present invention is described in more detail with reference to exemplary embodiments thereof as shown in the appended drawing. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

Figure 1:
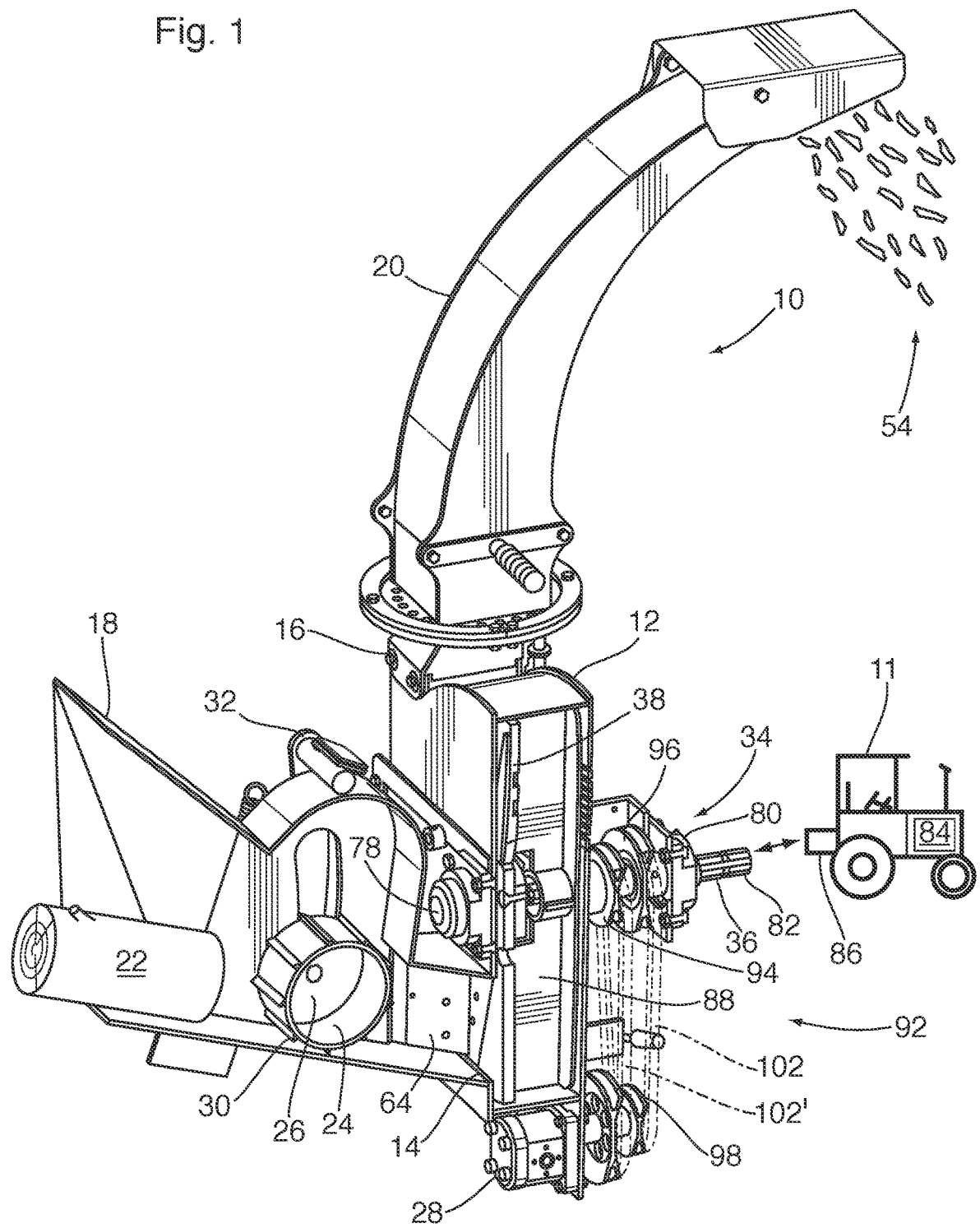
FIG. 1 is a cross-sectional view of a chipping or shredding apparatus incorporating a flywheel and paddle assembly according to an embodiment of the present invention.

A chipping or shredding apparatus 10 according to an embodiment of the present invention is shown in FIG. 1. For the purposes of illustration only, the apparatus 10 is shown in the form of a wood chipper configured for removably mounting on a tractor 11 outfitted with a power take off (PTO). However, the present invention is not limited to wood chippers, and is instead broadly directed to other apparatuses which are configured to reduce organic and inorganic materials, including wood chippers, brush chippers, leaf shredders, and the like.

As shown, the apparatus 10 has a housing 12, including an inlet opening 14, and an outlet opening 16. A hopper 18 is connected to the inlet opening 14, and a discharge chute 20 is connected to the outlet opening 16. As will be appreciated by persons skilled in the art, the hopper 18 may preferably be sized and shaped to feed and guide material 22 into the housing 12 through the outlet opening 14. By way of example, material 22 may be any suitably sized portion of a tree, a shrub, or under growth, including, trunks, limbs, and branches, as well as smaller vegetable matter, such as leaves, twigs, sticks, weeds, small plants, and other lawn and garden debris.

An infeed roller 24 may optionally be provided upstream of the inlet opening 14, for example in the hopper 18, to help pull the material 22 into the hopper 18, and to push the material 22 into the housing 12 through the inlet opening 14. Preferably, the infeed roller 24 may be a cylinder that is rotated by a hydraulic motor 26, powered by an engine driven hydraulic pump 28. Additionally, surface features, such as for example, longitudinal splines 30, may preferably be provided on the outer periphery of the infeed roller 24 to allow the infeed roller 24 to better grip the material 22 being fed into the hopper 18. As shown, in FIG. 1, the infeed roller 24 is carried by a swing arm 32 to allow the infeed roller 24 to move up and down to accommodate larger and smaller sizes of the material 22.

Figure 3:
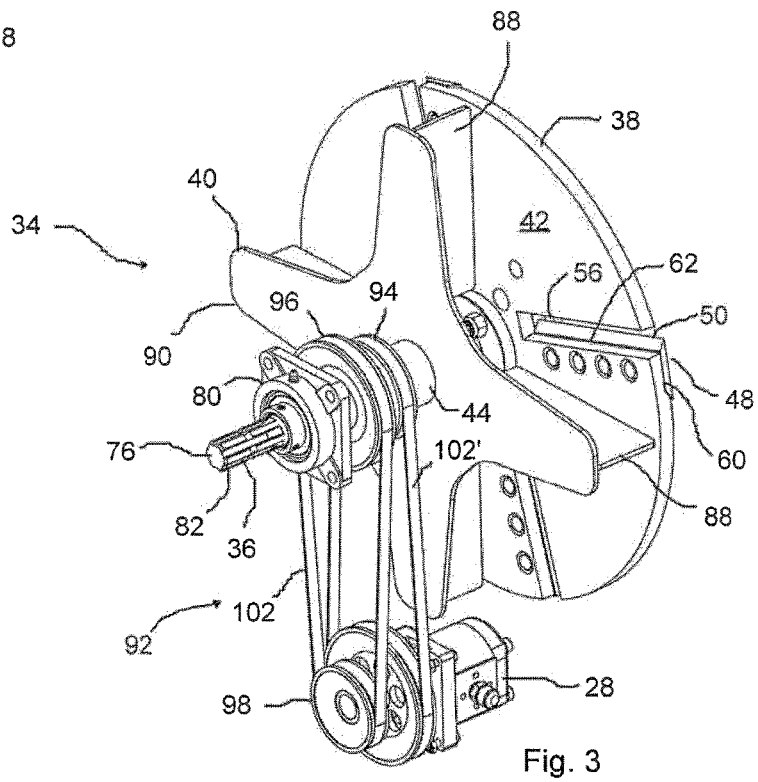
FIG. 3 is a rear perspective view of the flywheel and paddle assembly of FIG. 1.
Figures 4, 5:
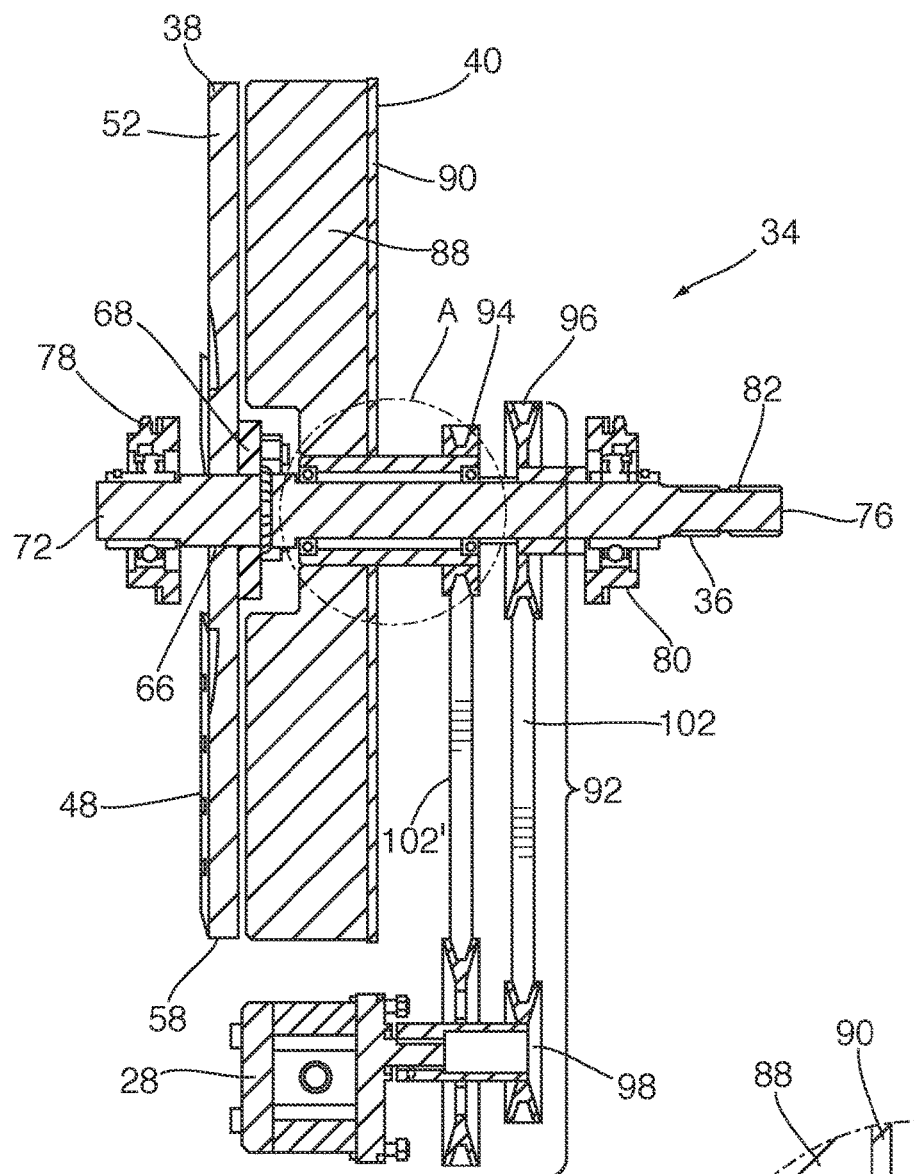
FIG. 4 is a side view of the flywheel and paddle assembly of FIG. 1.
FIG. 5. is an enlarged view of circle A of FIG. 4.
Figure 6:
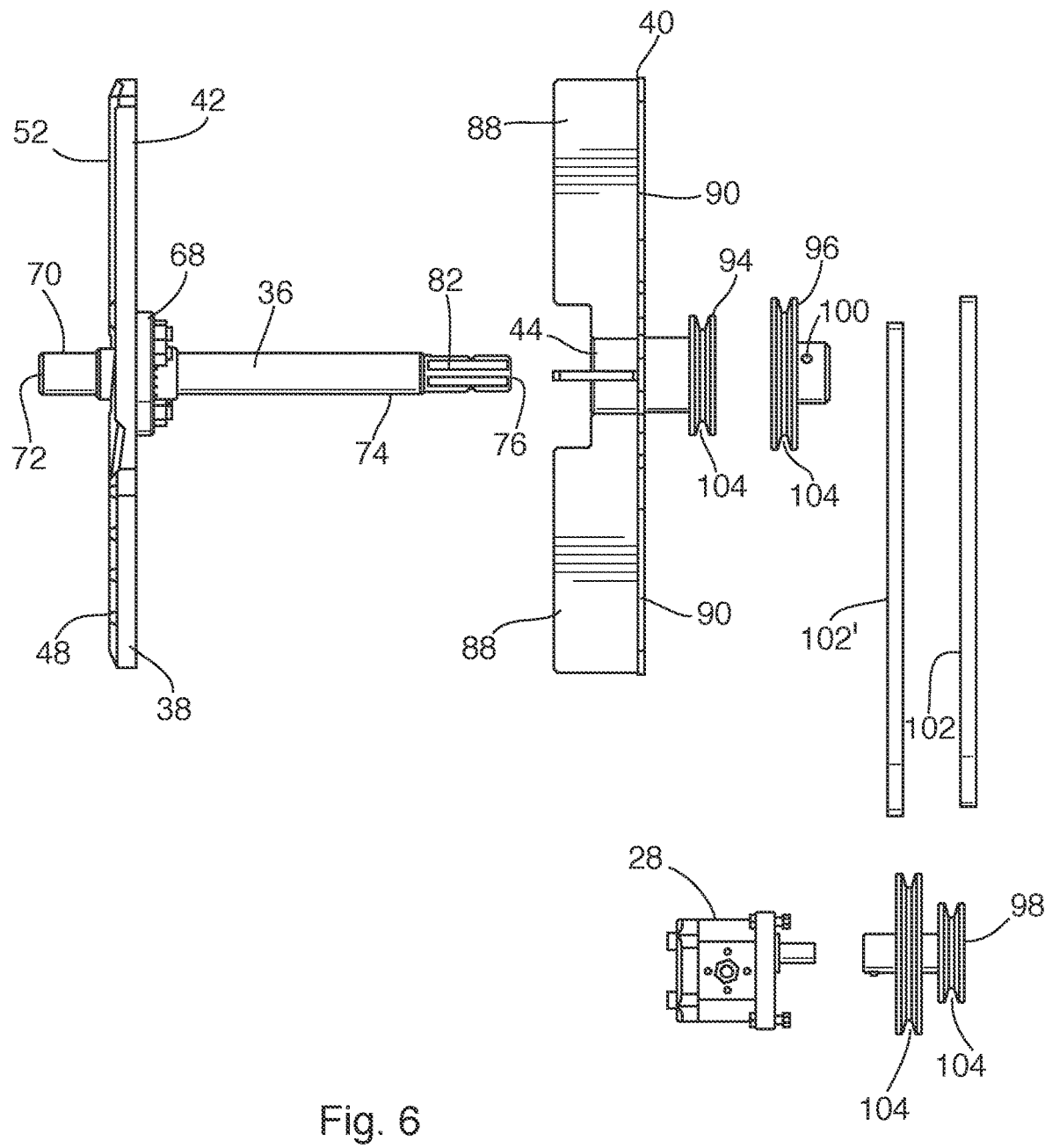
FIG. 6 is an exploded view of the flywheel and paddle assembly of FIG. 1.

With continued reference to FIG. 1, a flywheel and paddle assembly 34 is positioned, at least partly, within the housing 12 according to an embodiment of the present invention. As best seen in FIGS. 2 to 6, the flywheel and paddle assembly 34 includes a drive shaft 36, a flywheel 38, and a paddle 40. The flywheel 38 is attached coaxially to the drive shaft 36, and the paddle 40 is rotatably mounted coaxially to the drive shaft 36, adjacent to the back side 42 of the flywheel 38. The paddle 40 is configured to rotate on the drive shaft independently of the rotation of the drive shaft 36, and the flywheel 38 which is attached to the drive shaft 36. As best seen in FIG. 5, the hub 44 of the paddle 40 preferably has one or more roller bearings 46 to allow the paddle 40 to rotate on the drive shaft 36 independently of the rotation of the drive shaft 36 and the flywheel 38.

Figure 2:
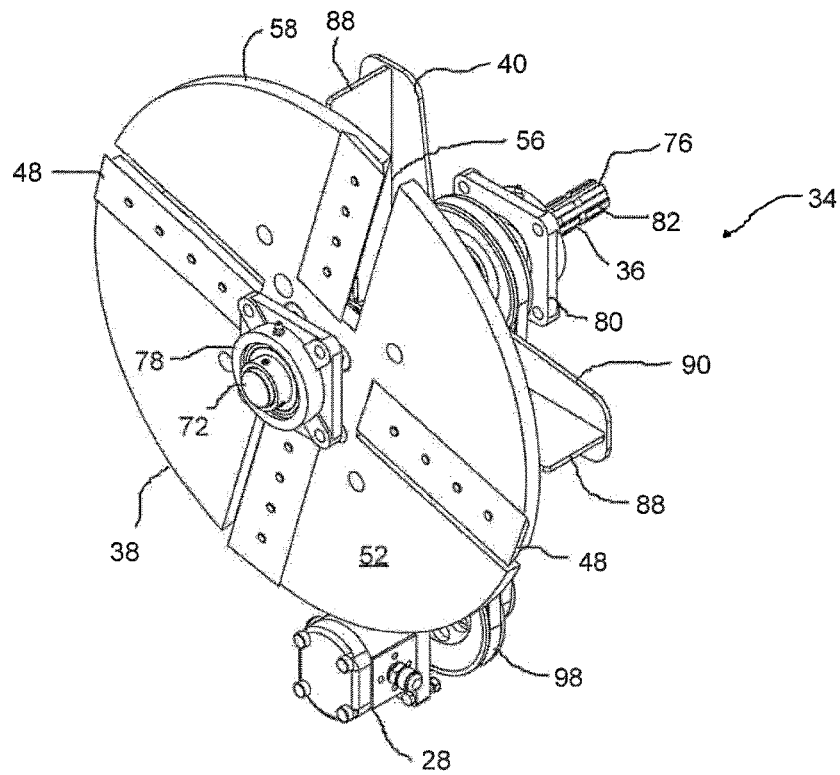
FIG. 2 is a front perspective view of the flywheel and paddle assembly of FIG. 1.

As best seen in FIG. 2, the flywheel 38 is preferably a round disk made from A8 steel. The size, weight and composition of the flywheel 38 may be modified depending on design considerations including the size and capacity of the apparatus, in a known manner. In particular, the flywheel 38 is preferably configured to be rotated at an unloaded speed of 540 rpm to store a predetermined amount of angular momentum. As is known in the art, a heavier flywheel 38 can store more angular momentum and therefore has a higher rating for chipping or shredding cellulosic material 22, such as wood. By way of example only, the flywheel 38 may be 24 inches in diameter, ¾ to 1 inch thick, and have a weight of approximately 100 pounds.

At least one knife 48 may be carried by the flywheel 38, so as to present a knife edge 50 on the front side 52 of the flywheel 38. Preferably, four knives 48 are carried by the flywheel 38 as shown in FIG. 3. However, it will be appreciated that more or fewer knives 48 may be carried by the flywheel 38 depending on considerations including the size and capacity of the apparatus 10. Each knife 48 is attached to the flywheel 38 adjacent to an aperture 56 extending from the front side 52 to the back side 42 of the flywheel 38. Preferably, each aperture 56 extends radially outwards from the center of the flywheel 38 to the edge 58 of the flywheel 38. By way of example only, the apertures 56 may be about 8.5 inches long, by about 2.75 wide, although these dimensions can vary depending on considerations including the size and capacity of the apparatus 10. The knives 48 are bolted in recesses 60 on the flywheel 38, sized and shaped to hold the knives 48 to project over the leading edges 62 of apertures 56. By way of example only, the knives 48 may be quadrilateral prisms made of A8 modified steel, although it will be appreciated that other types of steel may be used. Preferably, knife edges 50 are acute and their undersides are relieved to direct chipped or shredded material particles 54 into the adjacent apertures 56, so that the material particles 54 may pass to the back side 42 of the flywheel 38.

Preferably, a stationary cutter bar, or bed plate 64 may be mounted upstream of the inlet opening 14 of the housing 12, as shown in FIG. 1, to interact with the knives 48. It will be appreciated, the bed plate 64 may preferably be provided to guide material 22 toward the inlet opening 14 and to provide a shear point to facilitate cutting of the material by the knives 48. By way of example only, the bed plate 64 may be made of A8 tool steel, and sided to be about 8.2 inches long, 5.4 inches wide, and 0.3125 inches thick.

As best seen in FIG. 4, the flywheel 38 is attached coaxially to the drive shaft 36.

Preferably, the flywheel 38 is provided with a central bore 66, and the drive shaft 36 is preferably an elongate cylindrical member that is sized and shaped to extend partially through the central bore 66. By way of example only, the drive shaft 36 may be an elongate member made from steel, which is about two inches in diameter, and about 16 inches long, although these dimensions can vary depending on considerations including the size and capacity of the apparatus 10. Preferably, the drive shaft 36 may include a flywheel attachment flange 68 extending radially outwardly from the drive shaft 36, configured to attach the flywheel 34 coaxially to the drive shaft 36. The flywheel 34 may be attached to the flywheel attachment flange 68 by any known means, including welding or with fasteners. By way of example only, the flywheel attachment flange 68 may be a round flange that is about 5.3 inches in diameter and 0.7 inches thick, although these dimensions can vary depending on considerations including the size and capacity of the apparatus 10. Preferably, the flywheel 34 may be secured to the flywheel attachment flange 68 with four M16 bolts.

Preferably, the drive shaft 36 extends far enough through the central bore 66 to provide an upstream bearing support surface 70 at the upstream end 72 of the drive shaft 36. A downstream bearing support surface 74 is preferably provided at the downstream end 76 of the drive shaft 36. With reference back to FIG. 1, it can now be understood that the drive shaft 36 may preferably be rotatably supported at the upstream and downstream bearing support surfaces 70, 74, by upstream and downstream flange bearings 78, 80 attached to the housing 12. The upstream and downstream flange bearings 78, 80 may be attached to the housing 12 by any known means, including welding or with fasteners. By way of example only, the upstream and downstream flange bearings 78, 80 may be F210 four bolt flanged bearings.

Additionally, the downstream end 76 of the drive shaft 36 is preferably free and includes a coupling 82, or a part of a coupling configured to directly, or indirectly engage a motor 84. By way of example only, the coupling 82 according to the embodiment shown in FIG. 1, is a power takeoff coupling shaft that is sized and shaped for engaging a matching PTO coupling sleeve 86 on a tractor 11. However, it will be understood that the present invention is not limited to embodiments that require a tractor 11. Instead, it will be appreciated that other embodiments of the present invention may be powered by a motor 84 which is a part of the apparatus 10 itself. For example, the motor 84 mounted to the housing 12. Furthermore, other embodiments of the present invention may be powered by a motor 84 that is contained in a machine other than a tractor 11, but which is also separate from, yet may be operably coupled to the flywheel and paddle assembly 34 of the apparatus 10. What is important is that the flywheel and paddle assembly 34 is configured to be coupled, whether directly, or indirectly, to a motor 84 which is capable of rotating the flywheel 38 and paddle 40 at speeds sufficient to chip or shred material 22 into material particles 54, and to discharge the material particles 54 out of the apparatus 10. It will be appreciated that the motor 84 used in the present invention may be, for example, a combustion engine, an electric motor, a hydraulic motor, and the like.

Referring now to FIG. 3, there is shown a rear perspective view of the flywheel and paddle assembly 34, according to a preferred embodiment of the present invention. As can be seen, the paddle 40 is rotatably mounted on the drive shaft 36 adjacent to the flywheel 38. The paddle 40 preferably includes four blades or vanes 88, as shown in FIG. 3. However, it will be appreciated that more or fewer vanes 88 may be provided depending on considerations including the size and capacity of the apparatus 10. Preferably, the vanes 88 may be attached to one or more support members 90 extending radially outwardly from the hub 44. In the example shown, all four vanes 88 are attached to one cross-shaped support member 90. However, it will be appreciated that the four vanes 88 may be attached to four separate support members, in an alternate embodiment. Additionally, although the support member 90 is shown as being cross-shaped, the support member 90 may take on other shapes in alternate embodiments, including a circle, a square, or some other polygonal shape. When the support member 90 is provided, the vanes 88 may be attached to the support member 90 alone, or to both the support member 90 and the hub 44. However, the support member 90 may be omitted in other embodiments of the present invention, in which case the vanes 88 may be attached to the hub 44 alone. Preferably, when the support member 90 is included, it is configured to provide structural support for the vanes 88. Furthermore, the support member 90 may be sized and shaped to form the back walls of chambers into which material particles 54 enter briefly before being thrown out of the outlet opening 16 as flywheel 38 spins. For example, the chambers may be defined by the support member 90, the vanes 88, the back side 42 of the flywheel 38, and the housing 12. By way of example only, the vanes 88 may be about 10.4 inches long, 3 to 4 inches wide, and 0.25 inches thick, although these dimensions can vary depending on considerations including the size and capacity of the apparatus 10. What is important is that the paddle 40, including the vanes, be sized and shaped to create an air stream to blow material particles 54 out from the housing 12, and/or to physically throw the material particles 54 out from the housing 12, at a desirable rate, when the paddle 40 is rotated at operating rotational speeds.

As best seen in FIGS. 4 and 5, the hub 44 of the paddle 40 preferably has one or more ball bearings 46 to allow the paddle 40 to rotate on the drive shaft 36 independently of the rotation of the drive shaft 36. By way of example only, the ball bearings 46 may be 6908-2RS sealed bearings having dimensions 40 mm inside diameter, 62 mm outside diameter, and 12 mm width, although the dimensions of the ball bearings can be varied depending on considerations including the size and capacity of the apparatus 10.

With reference to FIGS. 3 and 4, the flywheel and paddle assembly 34 preferably includes a transmission 92 configured to operatively connect the drive shaft 36 to the paddle 40, such that while rotation of the drive shaft 36 directly drives rotation of the flywheel 38, the rotation of the drive shaft 36 indirectly drives rotation of the paddle 40 via the transmission 92.

The transmission 92 may take the form of an arrangement of wheels, or an arrangement of wheels and belts or chains, operatively connecting the drive shaft 36 to the paddle 40. By way of example, the wheels may take the form of gears, sprockets, pulleys, and the like, as well as combinations thereof.

As best seen in FIGS. 3 and 4, according to a preferred embodiment of the present invention, the transmission 92 may take the form of an arrangement of pulleys, including a first pulley 94 attached coaxially to the paddle 40, a second pulley 96 attached coaxially to the drive shaft 36, and a third pulley 98 interconnected between the first pulley 94 and the second pulley 96. As shown, the arrangement of pulleys may further include belts 102, 102' to interconnect the third pulley 98 between the first and second pulleys 94, 96. Preferably, the first pulley 94 may be permanently attached to the hub 44 of the paddle 40 by, for example welding. However, it will be appreciated that the first pulley 94 may be removably attached to the hub 44 of the paddle 40, for example with fasteners. Preferably, the second pulley 96 may be removably secured to the drive shaft 36 with a set screw 100 (FIG. 6), although other methods of securing the second pulley 96 to the drive shaft 36 will now be apparent to persons skilled in the art, including, for example, with one or more fasteners, a cotter pin, a clevis pin, or the like. Preferably, the belts 102, 102' may be belts, such as v-belts, flat belts, serpentine belts, or the like, and the first, second, and third pulleys 94, 96, 98 may include belt contacting regions 104 sized and shaped to match the belts 102, 102'.

According to a preferred embodiment of the present invention, the third pulley 98 may be attached to, or form a part of, a rotationally powered component. In this way, in addition to interconnecting the first and second pulleys 94, 96, the third pulley 98 may also provide the further function of powering the rotationally powered component. By way of example only, the rotationally powered component may be a hydraulic pump 28. Advantageously, the hydraulic pump 28 may be configured to power other features of the apparatus 10, such as, for example, the hydraulic motor 26 used to drive the infeed roller 24. Examples of other rotationally powered components may include an alternator, and a gearbox, such as a gearbox for a mechanical infeed system, and the like.

However, the rotationally powered component, such as the hydraulic pump 28, the alternator, the gearbox, and the like, mentioned above, may be omitted in other embodiments of the present invention. For example, the third pulley 98 may be attached to a simple axle, rather than the shaft of a rotationally powered component. In this regard, the third pulley 98 may be a simple idler pulley. What is important is that the third pulley 98 is configured to rotate about its axis, and to interconnect between the first and second pulleys 94, 96. Accordingly, the third pulley 38 will preferably be positioned relative to the first and second pulleys 94, 96, to align belt contacting regions 104 of the first and second pulleys 94, 96 with the respective belt contacting regions 104 of the third pulley 98.

With reference now to FIG. 4, it will now be understood that when the drive shaft 36 is rotated in one direction at a predetermined rotational speed, then the flywheel 38 will also rotate in the same direction, and at the same rotational speed, since the flywheel 38 is directly attached to the drive shaft 26. Furthermore, it will be appreciated that, without more, the paddle 40 will not rotate with significant momentum, since it is independent of the flywheel 38, and rotationally separated from the drive shaft 36 by the ball bearings 46 in its hub 44. However, the preferred embodiment of the present invention interconnects the paddle 40 to the drive shaft 36 with a transmission 92 so that while the drive shaft directly drives rotation of the flywheel 38, it also indirectly drives rotation of the paddle. Specifically, as the drive shaft 38 rotates, the second pulley 36 rotates at the same rotational speed, since it is physically attached to the drive shaft 38. In turn, the rotation of the second pulley 96 causes rotation of the third pulley 98, since it is physically connected by belt 102. At the same time, rotation of the third pulley 98 causes rotation of the first pulley 94, since it is physically connected by belt 102'. Finally, rotation of the first pulley 94 causes rotation of the paddle 40, since it is physically attached to its hub 44. Thus, rotation of the drive shaft 36 indirectly results in rotation of the paddle 40, via the arrangement of pulleys 94, 96, 98 and belts 102, 102' of the transmission 92, according to an embodiment of the present invention.

Furthermore, just as the diameters of gears, and correspondingly, their number of teeth, determine a gear ratio and thus the speed increases or reductions and the mechanical advantage that they can deliver, the diameters of pulleys determine those same factors. According to this known principle, if the diameters of the belt contacting regions 104 of the first, second, and third pulleys 94, 96, 98 are the same, then the rotational speed of the paddle 40, will be the same as the rotational speed of the flywheel 38. By way of example, if the drive shaft 36 is rotated at a rotational speed of 540 rpm, then the rotational speed of both the flywheel 38 and the paddle 40 will be 540 rpm.

The only way to increase (or decrease) the rotational speed of the flywheel 38 is to increase (or decrease) the rotational speed of the drive shaft 36. However, since the paddle 40 is configured to rotate on the drive shaft 36 independently of the flywheel 38, according to the present invention, then the rotational speed of the paddle 40 may be increased (or decreased) relative to the rotational speed of the flywheel 38. This may be accomplished by providing the first, second, or third pulleys 94, 96, 98 in which one or more belt contacting regions 104 have a different diameter. In other words, the ratio of the rotational speed of the paddle 40 to the rotational speed of the flywheel 38 may be changed from for example 1:1, to 1.5:1 or 2:1 (i.e. increase the rotational speed of the paddle 40) by changing the diameter of a belt contacting regions 104 in one or more of the first, second, and third pulleys 94, 96, 98. In the same way, the rotational speed of the paddle 40 may be changed from for example 1:1.5 or 1:2 (i.e. decrease the rotational speed of the paddle 40) by changing the diameter of a belt contacting region 104 in one or more of the first, second, and third pulleys 94, 96, 98.

The applicant has found that good results may be obtained by providing an arrangement of pulleys wherein the first pulley 94 with a belt contacting region 104 having a diameter of 12 cm, aligned with a belt contacting region 104 on the third pulley 98 having a diameter of 16 cm, and providing the second pulley 96 with a belt contacting region having a diameter of 15 cm, aligned with a belt contacting region 104 on the third pulley 98 having a diameter of 10 cm. Such an arrangement of pulleys results in the rotational speed of the paddle 40 to be in the same direction, and twice as fast as the rotational speed of the flywheel 38. By way of further explanation, typical tractors 11 have PTOs that spin at 540 rpm, and the applicant has found that transmitting the 540 rpm rotational speed directly to the flywheel 38 is preferable for doing the work of chipping or shredding material 22. On the other hand, the applicant has found that spinning the paddles faster, preferably 50% faster (i.e. 810 rpm), or more preferably 100% (i.e. 1,080 rpm) results in improved discharging of the material particles 54, with reduced clogging of the housing 12 or discharge chute 20.

Furthermore, the faster rotational speed of the paddle 40 results in improved distance that the material particles 54 are discharged from the discharge chute 20.

Figures 7, 8:
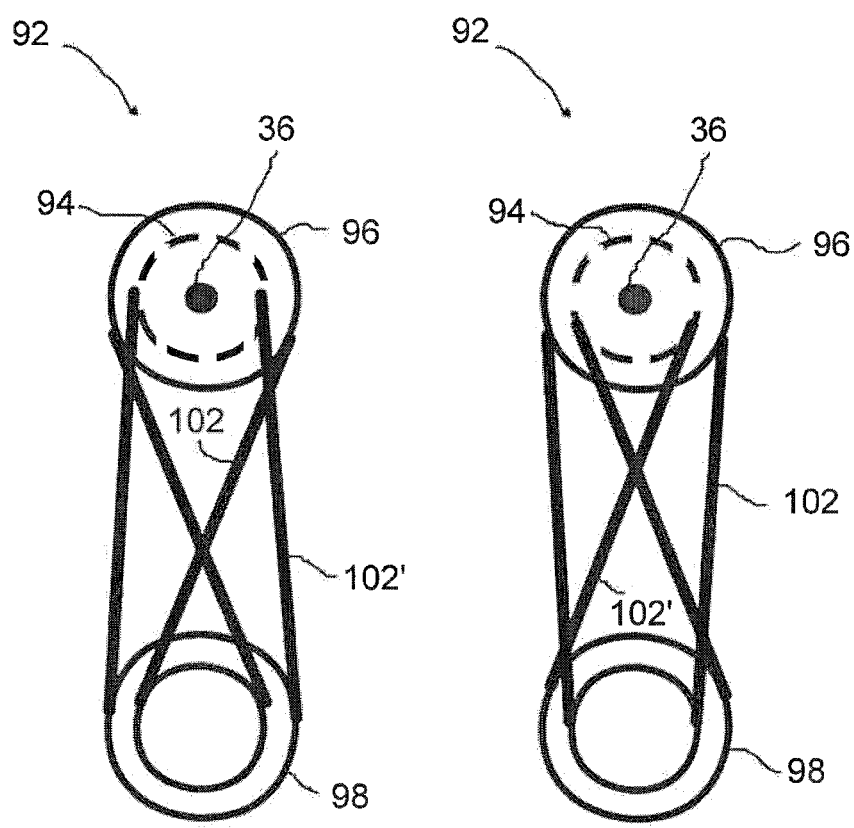
FIG. 7 is a front view of an arrangement of pulleys of the flywheel and paddle assembly showing a crossed belt according to another embodiment of the present invention.
FIG. 8 is a front view of an arrangement of pulleys of the flywheel and paddle assembly showing a crossed belt according to another embodiment of the present invention.

In some circumstances, it may be desirable for the paddle 40 to rotate in a rotational direction that is opposite to the rotational direction of the flywheel 38, rather than in the same rotational direction. By way of example only, one way of changing the rotational direction of the paddle 40 relative to the flywheel 38 is to cross the belt 102 or 102', as illustrated in FIGS. 7 and 8. Accordingly, when a straight belt arrangement is employed the paddle 40 may rotate in the same rotational direction as the flywheel 38, however, when a crossed belt arrangement is employed the paddle 40 may rotate in the opposite rotational direction as the flywheel 38.

Additionally, the present invention comprehends a method of adjusting the rotational speed of the paddle 40 relative to the flywheel 38, by adjusting the transmission 92 to change the rotational speed of the paddle 40. For example, the adjustment may be performed by changing a diameter of a belt contacting region 104 on one or more of the first pulley 94, the second pulley 96, and the third pulley 98. As another example, the adjustment may be performed by replacing the first pulley 94, the second pulley 96, or the third pulley 98, with a fourth pulley (not shown) having a belt contacting region 104 that is different (i.e. larger or smaller diameter) from the belt contacting region 104 on the pulley being replaced.

Figure 9:
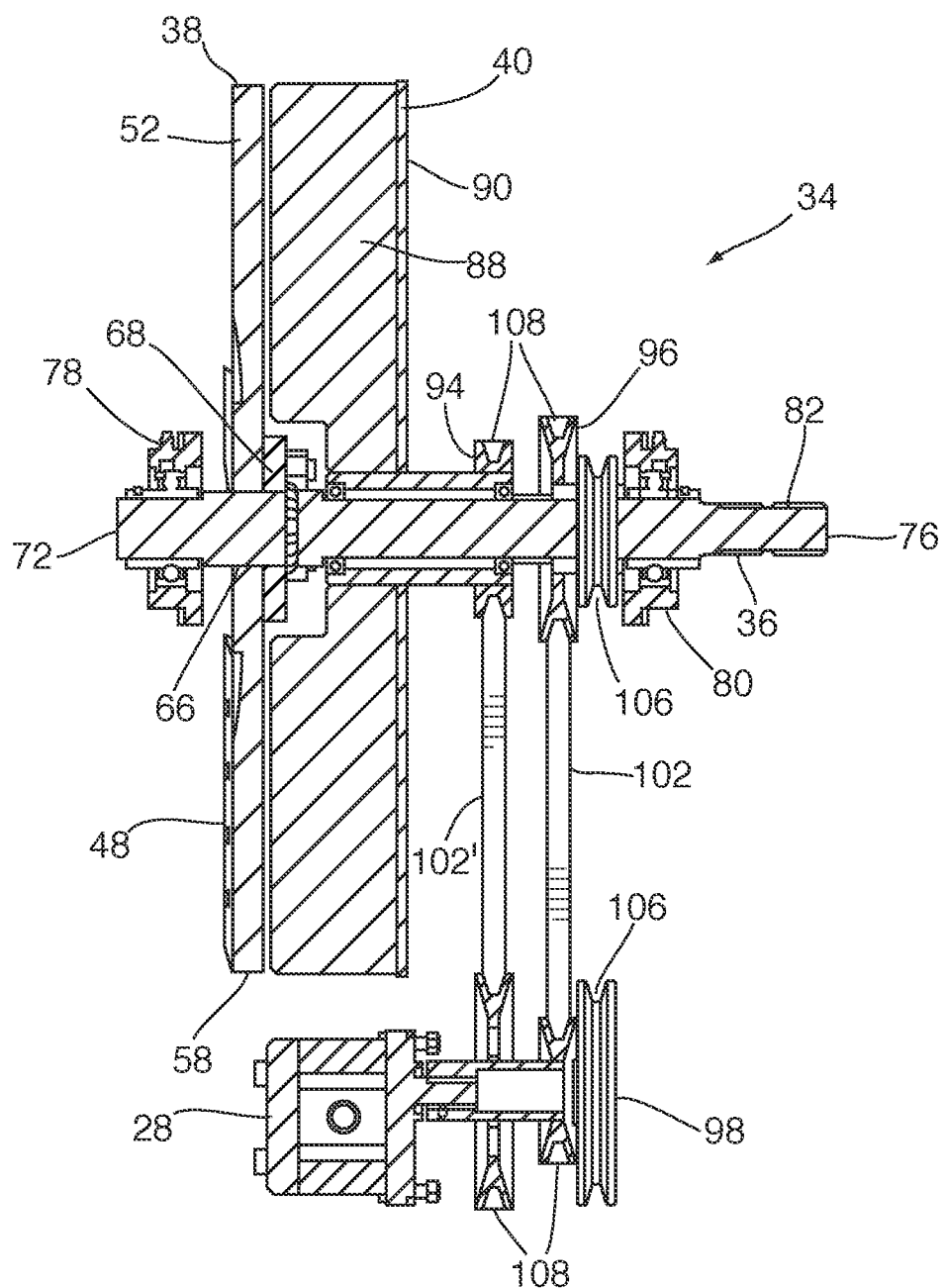
FIG. 9 is a side view of the flywheel and paddle assembly according to another embodiment of the present invention.

Furthermore, the arrangement of pulleys may be configured so that the adjustment may be performed by a user in the field. For example, in the embodiment of the invention shown in FIG. 9, the second pulley 96 and the third pulley 98 each include a free belt contacting region 106 in addition to the active belt contacting regions 108. In this embodiment, the adjustment to the rotational speed of the paddle 40 may be performed by a user moving the belt 102 along the second pulley 96 from the active belt contacting region 108 to the free belt contacting region 106, and at the same time pulling the belt 102 along the third pulley 98 from the active belt contacting region 108 to the free belt contacting region 106. As will now be appreciated, since the free belt contacting regions 106 have different diameters than the active belt contacting regions, the step of moving the belt 102 to the free belt contacting regions 106 will result in a change to the ratio in the rotational speed of the paddle 40, relative to the flywheel 38. Although only one free belt contacting region 106 is shown on each of the second and third pulleys 96, 98, it will be appreciated that more such free belt contacting regions 106 may be provided on one or more of the first, second, and third pulleys 94, 96, 98 depending on the number of adjustable rotational speeds that may be desired. All such embodiments of the present invention are comprehended by the present invention.

While reference has been made to various preferred embodiments of the invention, other variations, implementations, modifications, alterations and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

The embodiments of the invention in which an exclusive property or privilege is claimed are defined as follows:

1. A method of adjusting a rotational speed of a paddle in a chipping or shredding apparatus having a flywheel and paddle assembly comprising:
   a drive shaft;
   a flywheel attached coaxially to said drive shaft, said flywheel having a front side, a back side, and at least one aperture extending from the front side to the back side;
   at least one knife carried by said flywheel adjacent to said at least one aperture, said at least one knife presenting a knife edge on the front side of said flywheel;

a paddle rotatably mounted coaxially to said drive shaft adjacent to said back side of said flywheel, said paddle being configured to rotate on said drive shaft independently of said flywheel; and a transmission configured to operatively connect said drive shaft to said paddle, such that rotation of said drive shaft directly drives rotation of said flywheel, and indirectly drives rotation of said paddle via said transmission;

said method comprising the step of adjusting said transmission to change said rotational speed of said paddle;

wherein said transmission comprises:
 a first pulley attached coaxially to said paddle;
 a second pulley attached coaxially to said drive shaft;
 a third pulley;
 a first belt connecting said first pulley to said third pulley; and
 a second belt connecting said second pulley to said third pulley; and wherein said step of adjusting said transmission comprises:
 a) changing a diameter of a belt contacting region on said first pulley, said second pulley, or said third pulley;
 b) replacing said first pulley, said second pulley, or said third pulley, with a fourth pulley having a belt contacting region that is different from said belt contacting region on said replaced pulley; or
 c) moving said first belt or said second belt along said first, second, or third pulley, from an active belt contacting region to a free belt contacting region, said free belt contacting region having a different diameter than said active belt contacting region.

* * * * *